United States Patent
Sullivan et al.

(10) Patent No.: US 9,158,126 B1
(45) Date of Patent: Oct. 13, 2015

(54) ADJUSTABLE TEMPLE PIECE WITH SECUREMENT ATTACHMENT

(71) Applicant: FORTRESS GROUP, LLC, Lake Forest, CA (US)

(72) Inventors: Sean Sullivan, Lake Forest, CA (US); Mark Lohrbach, Lake Forest, CA (US)

(73) Assignee: Fortress Group, LLC, Lake Forest, CA (US)

( * ) Notice: Subject to any disclaimer, the term of this patent is extended or adjusted under 35 U.S.C. 154(b) by 0 days.

(21) Appl. No.: 14/255,084

(22) Filed: Apr. 17, 2014

(51) Int. Cl.
 *G02C 5/06* (2006.01)
 *G02C 5/20* (2006.01)
 *G02C 5/00* (2006.01)
 *G02C 5/16* (2006.01)

(52) U.S. Cl.
 CPC ............ *G02C 5/20* (2013.01); *G02C 5/008* (2013.01); *G02C 5/16* (2013.01)

(58) Field of Classification Search
 CPC .......... G02C 5/143; G02C 3/006; G02C 5/06; G02C 5/122; G02C 5/16; G02C 5/20
 USPC ................... 351/114, 118, 123, 119, 111, 156
 See application file for complete search history.

(56) References Cited

U.S. PATENT DOCUMENTS

| | | | | |
|---|---|---|---|---|
| 3,018,687 A | * | 1/1962 | Sadel | 351/113 |
| 3,582,194 A | * | 6/1971 | Liautaud | 351/156 |
| 4,012,130 A | | 3/1977 | Guillet | |
| 4,844,605 A | * | 7/1989 | Peterson et al. | 351/123 |
| 5,302,977 A | * | 4/1994 | Markovitz et al. | 351/114 |
| 5,422,685 A | | 6/1995 | Conway | |
| 6,547,388 B1 | * | 4/2003 | Bohn | 351/118 |
| 6,905,206 B2 | * | 6/2005 | Skuro | 351/118 |
| 7,159,978 B2 | * | 1/2007 | Skuro | 351/118 |

* cited by examiner

*Primary Examiner* — Hung Dang
(74) *Attorney, Agent, or Firm* — Stetina Brunda Garred & Brucker

(57) ABSTRACT

An adjustable eyewear temple system is disclosed. The system includes both a substantially rigid temple piece and a flexible cable temple piece, wherein the cable temple piece extends through a channel along the inside of the rigid temple piece. An adjustment piece allows the cable temple piece to be stored within the rigid temple piece when not needed. The system appears to a passerby as a standard temple piece due to the location of the channel and adjustment piece on the inside.

20 Claims, 4 Drawing Sheets

ADJUSTABLE TEMPLE PIECE WITH SECUREMENT ATTACHMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure relates generally to eyeglass frames featuring an adjustable temple piece with securement attachment, and more particularly to eyeglass frames which feature cable temples that may easily be extended and retracted per the wearer's need.

In general, eyeglasses are typically fashioned from a frame front (the portion that holds the lenses and bridges the top of the nose), temple members that extend over and/or behind the ears of the wearer, and hinges that attach the temple members to the frame front. For typical eyeglass use, the temples are usually fashioned in a rigid fashion in either a skull style (bent down slightly over the ear and following the contour of the skull) or paddle style (straight, to allow for easy placement and removal of the glasses). For normal daily use, skull and paddle temples are sufficient for most purposes. However, during brisk activity with rapid movements (for example, during sporting or physical activities) these temples can be insufficient to maintain the glasses in proper position on a wearer's head. While the loss of glasses can be inconvenient during these activities, it can also be dangerous during certain activities (for example, the loss of sunglasses during snow activities can potentially result in snowblindness and the loss of protective eyeglasses during ballistic activities). To help maintain glasses in place during strenuous activities, variations to the temples have been created. For example, spring-hinged temples include springs in the hinges to exert a pressure on the skull and cable temples hook behind the ear with a flexible cable. While these mechanisms aid in retaining glasses in position during strenuous activity, they often are uncomfortable to the user and/or not aesthetically pleasing. As such, there is a need in the art for eyeglasses that allow for retention during strenuous physical activities, while not being uncomfortable or unattractive during normal daily activity.

In order to overcome these problems, various solutions have been introduced. For example, U.S. Pat. No. 4,012,130 issued Mar. 15, 1977 to Guillet and U.S. Pat. No. 5,422,685 issued Jun. 6, 1996 to Conway. While the eyeglasses described in the Guillet and Conway patents provide secondary cable temples that may be stored in or along primary rigid temples when not needed, in both cases the secondary cable temples (or at least portions of them) are visible even when stored, thereby reducing the aesthetic quality of the eyeglasses. As such, there is need in the art for eyeglasses that allow for easy retention during strenuous physical activities, that appear visually as standard eyeglasses during normal daily activity.

BRIEF SUMMARY

In accordance with one embodiment of the present disclosure, there is contemplated an adjustable eyewear temple system. The system includes a substantially rigid temple piece with an inner end configured to be attached to an eyeglass frame front and an outer end which extends over and behind an ear of a wearer. Further, there is a channel extending longitudinally within the substantially rigid temple piece, configured such that an opening of the channel faces the inside of the substantially rigid temple piece. Additionally, there is an opening located on the inside of the substantially rigid temple piece between the channel and the outer end of the substantially rigid temple piece. Within the channel is a flexible cable temple piece. The flexible cable temple piece can be moved between a stored position in which most of the length of the flexible cable temple piece is within the channel and a deployed position in which most of the length of the flexible cable temple piece extends out of the opening. When deployed, the flexible cable temple piece assumes a generally arcuate shape, such that the flexible cable temple piece is capable of gripping an ear of the wearer. Extending outwardly from the flexible cable temple piece is an adjustment piece that extends outside of the channel on the inside of the substantially rigid temple piece. The adjustment piece allows the wearer to adjust the flexible cable temple piece between the stored position and the deployed position by manually moving the adjustment piece back and forth within the channel. In certain embodiments, the substantially rigid temple piece may be fabricated from materials known within the art such as, but not limited to, metal, an injection molded plastic, or cellulose acetate. Further, the flexible cable temple piece may be fabricated from materials known in the art that will retain the arcuate shape when deployed, but that are readily flexible enough to straighten when stored within the channel, such as wound metal or resilient plastic. The flexible cable temple piece may further be wrapped in a soft material to better aid in comfort to the wearer.

Another embodiment of the present disclosure is an adjustable eyewear temple system wherein there is further an elastic object positioned within the channel between the flexible cable temple piece and an inner end portion of the channel. The elastic object compresses when the flexible cable temple piece is in the stored position and urges the flexible cable temple piece into the deployed position. In this embodiment, the channel runs along the bottom of the substantially rigid temple piece rather than the inside. In this embodiment, in order to maintain the flexible cable temple piece in the stored position, against the urging of the elastic object, the adjustment piece is rotated toward the inside of the substantially rigid temple member and secured within a retaining notch. By rotating the adjustment piece back to the bottom position, the retaining notch no longer secures it and the elastic object pushes the flexible cable temple piece into the deployed position. The elastic object may take various configurations, one of which is a spring.

Yet another embodiment of the present disclosure is an adjustable eyewear temple system wherein the substantially rigid temple piece takes the form of a paddle style temple piece, i.e., it extends in a straight fashion over the ear of the wearer without a curving portion that bends beyond the wearer's ear. This allows for ease of putting on and taking off of the glasses, while still allowing secure usage if the flexible cable temple pieces are deployed. Optionally, an elastic strap may be further attached to the outer end of the substantially rigid temple piece, in order to provide even further security in maintaining the glasses in place on the wearer's face, similar to goggles.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
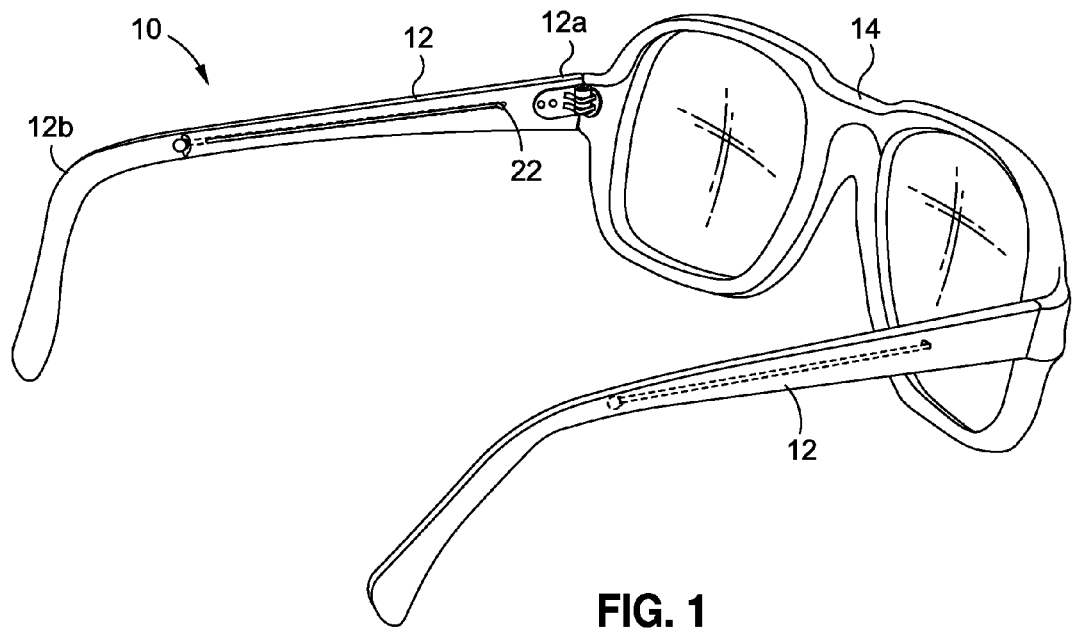
FIG. 1 is a perspective view of eyeglasses with cable temples in a stored position in accordance with one embodiment of the present invention.
Figure 2:
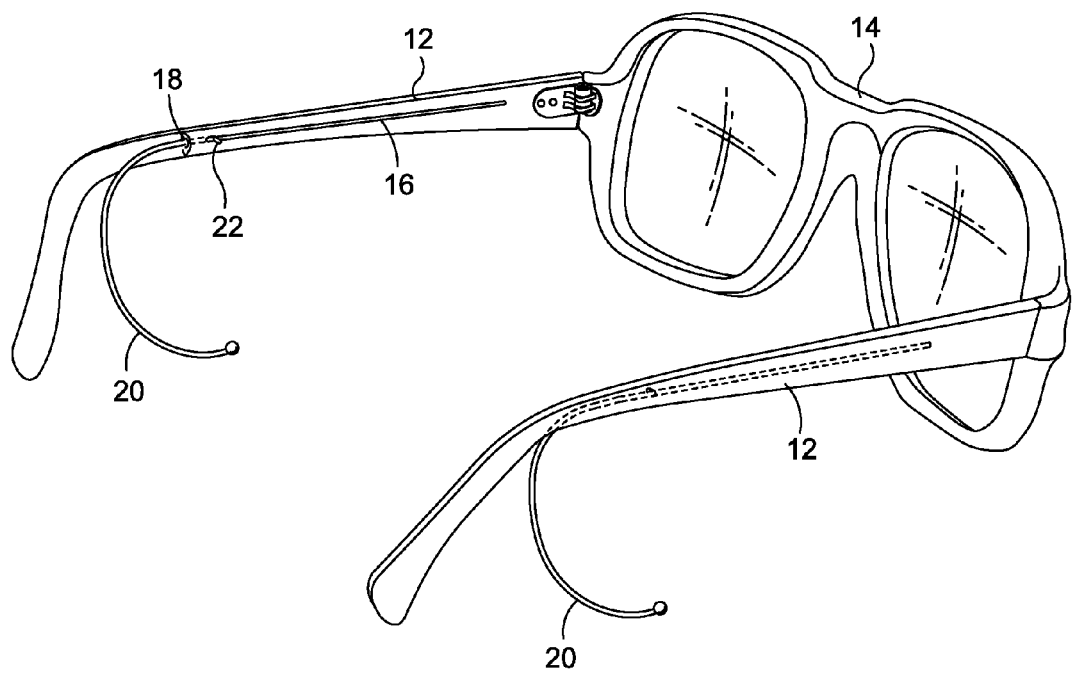
FIG. 2 is a perspective view of the eyeglasses shown in FIG. 1 with the cable temples deployed.
Figure 3:
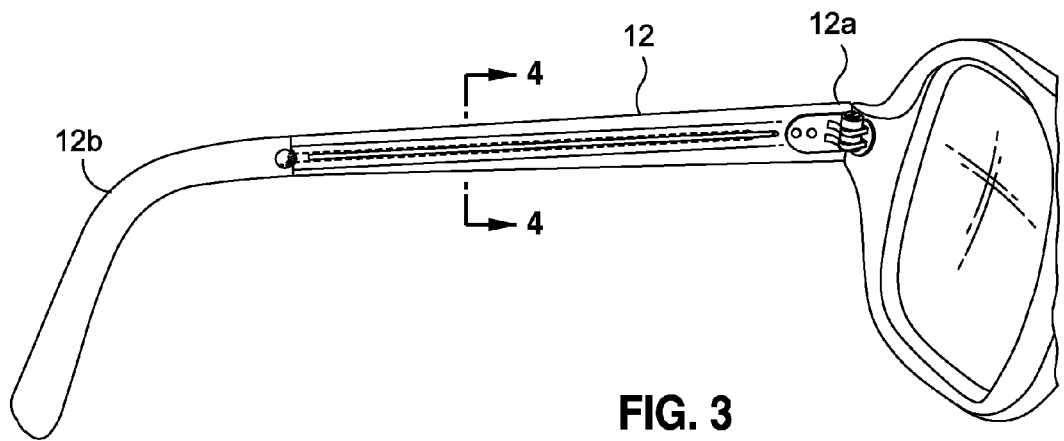
FIG. 3 is a side view of the eyeglasses shown in FIG. 1.
Figure 4:
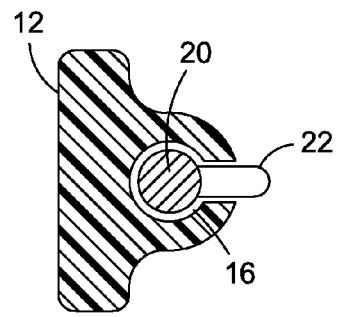
FIG. 4 is a cross-sectional view of the eyeglasses shown in FIG. 3.
Figure 5:
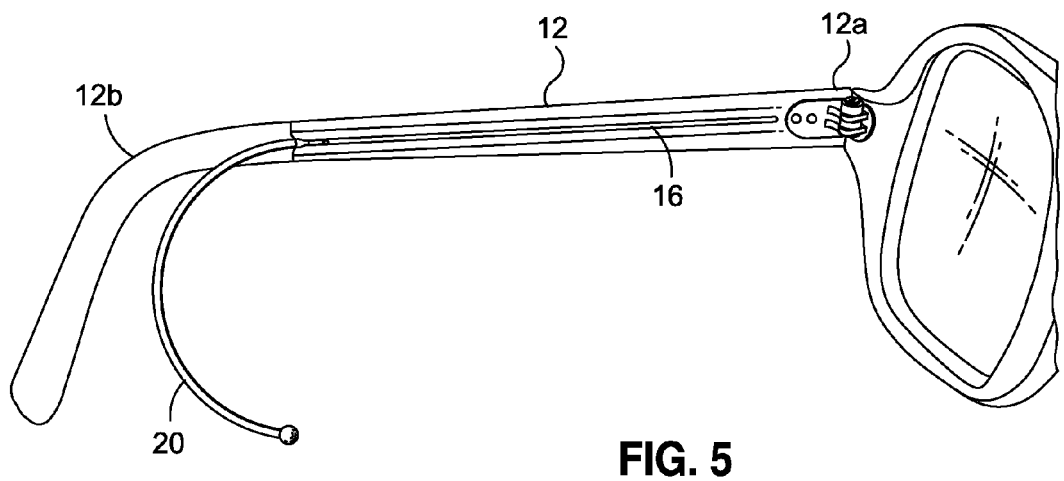
FIG. 5 is a side view of the eyeglasses shown in FIG. 2.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring to FIGS. 1-5, one embodiment of an adjustable eyewear temple system 10 is generally comprised of a substantially rigid temple piece, wherein the rigid temple piece 12 has an inner end 12a configured to be attached to an eyeglass frame front 14 and an outer end 12b which extends over and behind an ear of a wearer. The rigid temple piece 12 may be fashioned from suitable materials known within the art including, but not limited to, metal, injection molded plastic, and cellulose acetate. The rigid temple piece 12 further has a channel 16 integrally formed within. The channel 16 extends longitudinally along the inside of the substantially rigid temple piece 12. The rigid temple piece 12 further has an opening 18 located on the inside of the substantially rigid temple piece 12 and positioned between the channel 16 and the outer end 12b of the substantially rigid temple piece 12. Positioned within the channel 16, is a flexible cable temple piece 20. The flexible cable temple piece 20 is moveable between a stored position (shown in FIGS. 1 and 3) in which most of the length of the flexible cable temple piece 20 is within the channel 16 and a deployed position (shown in FIGS. 2 and 5) in which most of the length of the flexible cable temple piece 20 extends out of the opening 18 and assumes a generally arcuate shape for gripping the ear of the wearer. The cable temple piece 20 may be fashioned from any suitably flexible material that will retain the generally arcuate shape when deployed, while maintaining enough flexibility to be straightened when stored in the channel 16. Examples of such suitable materials include wound metal and elastic plastics. As can best be seen in FIG. 4, extending outwardly from the flexible cable temple piece 20 is an adjustment piece 22 that extends outside of the channel 16 on the inside of the substantially rigid temple piece 12. The adjustment piece 22 allows the wearer to adjust between the stored position and the deployed position by manually moving the flexible cable temple piece 20.

Figure 6:
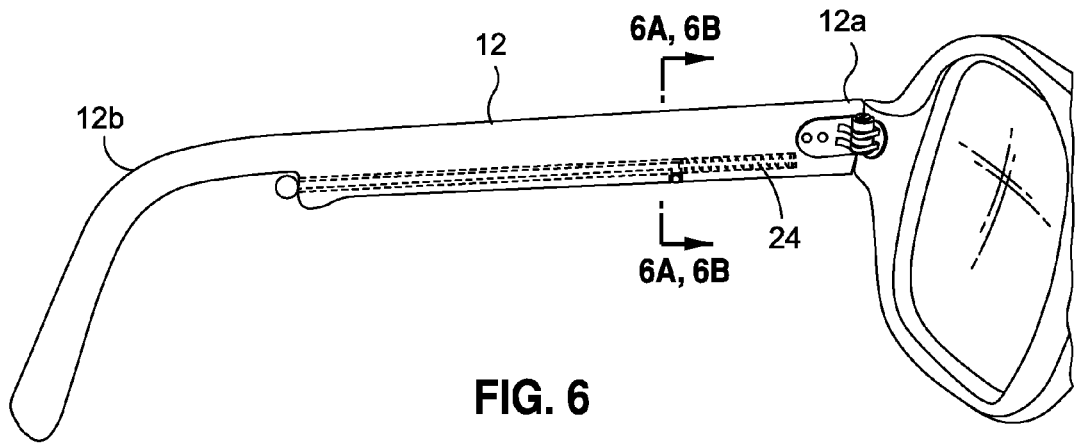
FIG. 6 is a side view of another embodiment of the eyeglasses of the present invention featuring an elastic object with the cable temples in a stored position.
Figure 6A:
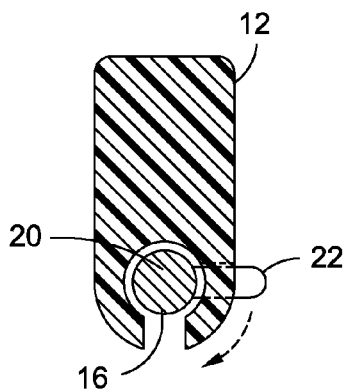
FIG. 6A is a cross-sectional view of the eyeglasses shown in FIG. 6 with the cable temples in the stored position.
Figure 6B:
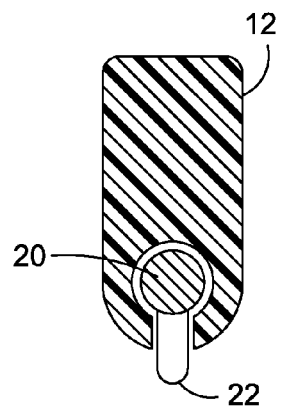
FIG. 6B is a cross-sectional view of the eyeglasses shown in FIG. 6 with the cable temples deployed.
Figure 7:
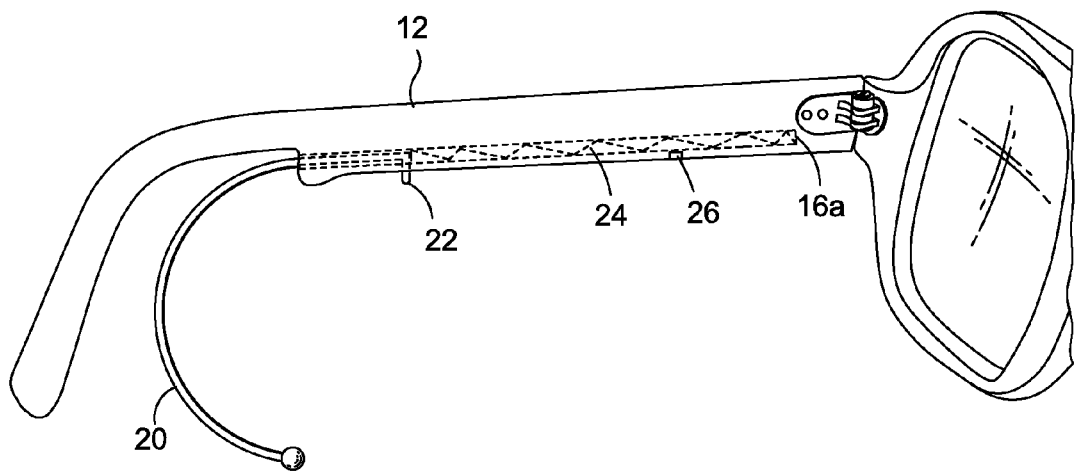
FIG. 7 is a side view of the eyeglasses shown in FIG. 6 with the cable temples in the deployed position.

In another embodiment shown in FIGS. 6-7, the system 10 may further include an elastic object 24 positioned within the channel 16 between the cable temple piece 20 and an inner end portion 16a of the channel 16. The elastic object 24 may take the form of any suitable device that will tend to return to an extended position, for example, a spring. The elastic object 24 serves to urge the cable temple piece 20 into the deployed position. In this embodiment, the channel 16 runs along the bottom of the rigid temple piece 12 and further includes a retaining notch 26. The retaining notch 26 is formed on the inside of the rigid temple piece 12 such that when the cable temple piece 20 is fully in the stored position, the adjustment piece 22 may be rotated from the bottom of the rigid temple piece 12 to the inside of the rigid temple piece 12 (shown in FIG. 6A). As such, when the adjustment piece 22 is secured within the retaining notch 26, the cable temple piece 20 remains in the stored position against the urging of the elastic object 24. By rotating the adjustment piece 22 back to the bottom of the rigid temple piece 12 (shown in FIG. 6B), the cable temple piece 20 is able to travel through the channel 16 into the deployed position.

Figure 8:
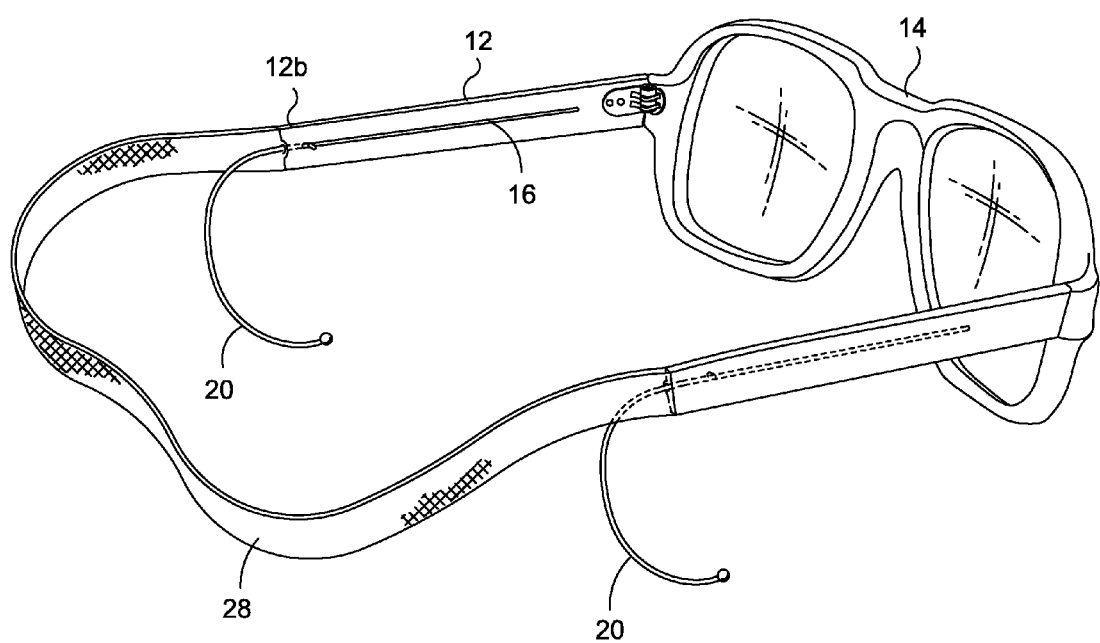
FIG. 8 is a perspective view of another embodiment of the eyeglasses of the present invention featuring paddle temples.

In an additional embodiment, shown in FIG. 8, the outer end 12b of the substantially rigid temple piece 12 extends over, but not behind, an ear of a wearer. More particularly, the outer end 12b remains in the straightened fashion of the rest of the rigid temple piece 12 and does not curve behind the ear or conform to the skull, in the form of a typical "paddle style" temple piece. Optionally, in this embodiment the system 10 may further include an elastic strap 28 that attaches to the outer end 12b of the substantially rigid temple piece 12. The elastic strap 28 provides further security in maintaining the glasses on the wearer's face in the style of goggles.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An adjustable eyewear temple system comprising:
   (a) a substantially rigid temple piece having an inner end configured to be attached to an eyeglass frame front and an outer end which extends over and behind an ear of a wearer;
   (b) a channel extending longitudinally within the substantially rigid temple piece along the inside of the substantially rigid temple piece;
   (c) an opening located on the inside of the substantially rigid temple piece positioned between the channel and the outer end of the substantially rigid temple piece;
   (d) a flexible cable temple piece positioned within the channel, the flexible cable temple piece moveable between a stored position in which most of the length of the flexible cable temple piece is within the channel and a deployed position in which most of the length of the flexible cable temple piece extends out of the opening and assumes a generally arcuate shape for gripping the ear of the wearer; and
   (e) an adjustment piece that extends outwardly from the flexible cable temple piece and outside of the channel on the inside of the substantially rigid temple piece, the adjustment piece allowing the wearer to adjust the flexible cable temple piece between the stored position and the deployed position.

2. The system of claim 1, wherein the substantially rigid temple piece is fabricated from metal.

3. The system of claim 2, wherein the substantially rigid temple piece is fabricated from an injection molded plastic.

4. The system of claim 2, wherein the substantially rigid temple piece is fabricated from cellulose acetate.

5. The system of claim 2, wherein the flexible cable temple piece is fabricated from a wound metal.

6. The system of claim 2, wherein the flexible cable temple piece is fabricated from a plastic.

7. An adjustable eyewear temple system comprising:
   (a) a substantially rigid temple piece having an inner end configured to be attached to an eyeglass frame front and an outer end which extends over an ear of a wearer;
   (b) a channel extending longitudinally within the substantially rigid temple piece along the bottom of the substantially rigid temple piece;
   (c) an opening located on the substantially rigid temple piece positioned between the channel and the outer end of the substantially rigid temple piece;
   (d) a flexible cable temple piece positioned within the channel, the flexible cable temple piece moveable between a stored position in which most of the length of the flexible cable temple piece is within the channel and a deployed position in which most of the length of the flexible cable temple piece extends out of the opening and assumes a generally arcuate shape for gripping the ear of the wearer;
   (e) an elastic object positioned within the channel between the flexible cable temple piece and an inner end portion of the channel, wherein the elastic object urges the flexible cable temple piece into the deployed position; and
   (f) an adjustment piece that extends outwardly from the flexible cable temple piece and outside of the channel, the adjustment piece allowing the wearer to adjust the flexible cable temple piece between the stored position and the deployed position, wherein in the stored position the adjustment piece is rotated toward the inside of the substantially rigid temple member and secured within a notch and wherein the user rotates the adjustment piece to the bottom of the substantially rigid temple member to move the flexible cable temple piece to the deployed position.

8. The system of claim 7, wherein the substantially rigid temple piece is fabricated from metal.

9. The system of claim 7, wherein the substantially rigid temple piece is fabricated from an injection molded plastic.

10. The system of claim 7, wherein the substantially rigid temple piece is fabricated from cellulose acetate.

11. The system of claim 7, wherein the flexible cable temple piece is fabricated from a wound metal.

12. The system of claim 7, wherein the flexible cable temple piece is fabricated from a plastic.

13. The system of claim 7, wherein the elastic object is a spring.

14. An adjustable eyewear temple system comprising:
   (a) a substantially rigid temple piece having an inner end configured to be attached to an eyeglass frame front and an outer end which extends over, but not behind, an ear of a wearer;
   (b) a channel extending longitudinally within the substantially rigid temple piece along the inside of the substantially rigid temple piece;
   (c) an opening located on the inside of the substantially rigid temple piece positioned between the channel and the outer end of the substantially rigid temple piece;
   (d) a flexible cable temple piece positioned within the channel, the flexible cable temple piece moveable between a stored position in which most of the length of the flexible cable temple piece is within the channel and a deployed position in which most of the length of the flexible cable temple piece extends out of the opening and assumes a generally arcuate shape for gripping the ear of the wearer; and
   (e) an adjustment piece that extends outwardly from the flexible cable temple piece and outside of the channel on the inside of the substantially rigid temple piece, the adjustment piece allowing the wearer to adjust the flexible cable temple piece between the stored position and the deployed position.

15. The system of claim 14, wherein the substantially rigid temple piece is fabricated from metal.

16. The system of claim 14, wherein the substantially rigid temple piece is fabricated from an injection molded plastic.

17. The system of claim 14, wherein the substantially rigid temple piece is fabricated from cellulose acetate.

18. The system of claim 14, wherein the flexible cable temple piece is fabricated from a wound metal.

19. The system of claim 14, wherein the flexible cable temple piece is fabricated from a plastic.

20. The system of claim 14, further comprising an elastic strap attached to the outer end of the substantially rigid temple piece.

\* \* \* \* \*